US008516557B2

(12) United States Patent
 Jin (10) Patent No.: US 8,516,557 B2
(45) Date of Patent: Aug. 20, 2013

(54) USER TERMINAL WITH SECURITY FUNCTION AND SECURITY-CONTROL METHOD

(75) Inventor: Weon-il Jin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 932 days.

(21) Appl. No.: 12/118,282

(22) Filed: May 9, 2008

(65) Prior Publication Data

US 2009/0183231 A1    Jul. 16, 2009

(30) Foreign Application Priority Data

Jan. 14, 2008    (KR) .................. 10-2008-0004017

(51) Int. Cl.
 *G06F 21/00* (2006.01)
(52) U.S. Cl.
 USPC ........................... 726/5; 726/28; 713/183
(58) Field of Classification Search
 None
 See application file for complete search history.

(56) References Cited

U.S. PATENT DOCUMENTS

| | | | | |
|---|---|---|---|---|
| 4,805,222 A * | 2/1989 | Young et al. | ............. | 382/115 |
| 5,229,764 A * | 7/1993 | Matchett et al. | ........ | 340/5.52 |
| 6,151,593 A * | 11/2000 | Cho et al. | ................ | 706/16 |
| 6,405,922 B1 * | 6/2002 | Kroll | ..................... | 235/379 |
| 7,133,792 B2 * | 11/2006 | Murakami et al. | ...... | 702/104 |
| 7,372,979 B2 * | 5/2008 | Hillhouse et al. | ........ | 382/115 |
| 7,509,686 B2 * | 3/2009 | Checco | ...................... | 726/27 |
| 7,526,412 B2 * | 4/2009 | Mani et al. | .............. | 702/194 |
| 7,571,326 B2 * | 8/2009 | Chen | ........................ | 713/186 |
| 7,706,574 B1 * | 4/2010 | Ross | ......................... | 382/115 |
| 7,995,802 B2 * | 8/2011 | Hu et al. | .................. | 382/115 |
| 8,020,005 B2 * | 9/2011 | Mani et al. | .............. | 713/182 |
| 8,151,343 B1 * | 4/2012 | Wang et al. | .............. | 726/19 |
| 8,260,740 B2 * | 9/2012 | Davis et al. | ............. | 707/603 |
| 8,332,932 B2 * | 12/2012 | Kellas-Dicks et al. | ..... | 726/18 |
| 2003/0148775 A1 * | 8/2003 | Spriestersbach et al. | ... | 455/456 |
| 2004/0059950 A1 * | 3/2004 | Bender et al. | ........... | 713/202 |
| 2005/0166065 A1 * | 7/2005 | Eytchison et al. | ....... | 713/189 |
| 2006/0242424 A1 * | 10/2006 | Kitchens et al. | ......... | 713/183 |
| 2007/0032992 A1 * | 2/2007 | Trowbridge et al. | ...... | 702/193 |
| 2007/0162763 A1 * | 7/2007 | Bender et al. | ........... | 713/186 |

(Continued)

FOREIGN PATENT DOCUMENTS

| | | |
|---|---|---|
| JP | 09-215057 | 8/1997 |
| JP | 2001-92585 | 4/2001 |

(Continued)

OTHER PUBLICATIONS

M.S. Obaidat and B. Sadoun. "Keystroke Dynamics Based Authentication," Biometrics 2002, pp. 213-229, Springer, US.*

(Continued)

*Primary Examiner* — Michael R Vaughan
(74) *Attorney, Agent, or Firm* — NSIP Law (57) ABSTRACT

A user terminal apparatus with a security function and a security-control method are provided, which may prevent unauthorized use of the user terminal apparatus without requiring a user to lock up the user terminal apparatus. The user terminal apparatus includes an input sensing unit which senses a user's input to the user terminal apparatus, an information collecting unit which collects information regarding an input state, which is determined based on the user's input, and a transition of the determined state, and a security-control unit which determines whether the user is valid based on the collected information and controls a security function.

11 Claims, 7 Drawing Sheets

(56) References Cited

U.S. PATENT DOCUMENTS

| | | | | |
|---|---|---|---|---|
| 2007/0214354 | A1* | 9/2007 | Renaud | 713/155 |
| 2007/0245420 | A1* | 10/2007 | Yong et al. | 726/23 |
| 2008/0133933 | A1* | 6/2008 | Bender | 713/186 |
| 2009/0049544 | A1* | 2/2009 | Kashi | 726/19 |
| 2009/0240949 | A9* | 9/2009 | Kitchens et al. | 713/183 |

FOREIGN PATENT DOCUMENTS

| | | |
|---|---|---|
| JP | 2005-352976 | 12/2005 |
| JP | 2006-172129 | 6/2006 |
| KR | 10-2002-0074305 | 9/2002 |
| KR | 10-2006-0078813 | 7/2006 |

OTHER PUBLICATIONS

Mary Curtin, Charles Tappert, Mary Villani, Giang Ngo, Justin Simone, Huguens St. Fort, and Sung-Hyuk Cha. "Keystroke Biometric Recognition on Long-Text Input: A Feasibility Study," Proc. Int. Workshop Sci Comp/Comp Stat, 2006, Hong Kong.*

* cited by examiner

FIG.5

USER TERMINAL WITH SECURITY FUNCTION AND SECURITY-CONTROL METHOD

CROSS REFERENCE TO RELATED APPLICATIONS

This application claims the benefit under 35 U.S.C. §119 (a) of a Korean Patent Application No. 10-2008-0004017, filed on Jan. 14, 2008, the disclosure of which is incorporated herein in its entirety by reference.

TECHNICAL FIELD

The following description relates to a user terminal apparatus having a security function and a security-control method, and more particularly, to a user terminal apparatus and a method which provides a security function, thereby preventing an invalid user from using the user terminal apparatus.

BACKGROUND

It has become more common to store a variety of information including personal information in user terminal apparatuses such as mobile phones, personal digital assistants (PDAs), and portable multimedia players (PMPs). Accordingly, there is an increasing need to prevent unauthorized use of a user terminal apparatus. To this end, a user terminal apparatus can be locked and released by the use of passwords or fingerprints. However, in such a locking method, a user needs to get authorized by inputting his/her fingerprint or passwords every time using the user terminal apparatus in a locked status, and if the user has lost the user terminal apparatus, unauthorized use can be prevented only if the user locked up the user terminal apparatus before.

SUMMARY

Accordingly, in one aspect, there is provided a user terminal apparatus and a security-control method which prevents unauthorized use of the user terminal apparatus without requiring a user to perform a specific operation such as setting to lock the user terminal apparatus.

According to another aspect, there is provided a user terminal apparatus and a method which interprets an input of a user each time a user motion is sensed, collect information based on the interpreted input a predetermined number of times, and determine whether a user is authorized to use the terminal apparatus by using the collected information, thereby preventing unauthorized use of the user terminal apparatus.

According to still another aspect, there is provided a user terminal apparatus comprising an input sensing unit which senses a user's input to the user terminal apparatus, an information collecting unit which collects information regarding an input state, which is determined based on the user's input, and a transition of the determined state, and a security-control unit which determines whether the user is valid based on the collected information and controls a security function.

The security-control unit may determine whether the user is valid by using pieces of information which are collected a predetermined number of times which is the minimum number of times that information for determining whether the user is valid is collected. The input state may be determined based on a result obtained by evaluating or processing the input of the user.

Criteria for determining whether a user in the security-control unit is valid may be initially set.

The security-control unit may compare a number of times of occurrence of a specific input state among the determined states with a predetermined reference number of times to determine whether the user is valid.

When the information is collected a sample number of times which is a multiple of the predetermined number of times that the information for determining whether a user is valid is collected and is obtained by counting only the cases in which a user is determined to be valid, the security-control unit may update previously set probability information, which includes probabilities of occurrence of each input state and probabilities of transitions between the input states, using probability information that is obtained based on information collected only when the user is determined to be valid, from among pieces of information which are collected until the sample number of times is reached, and reset the predetermined number of times that the information for determining whether a user is valid is collected and the predetermined reference number of times based on the updated probability information.

The security-control unit may compare a probability of occurrence of a state transition path with a predetermined reference value to determine whether a user is valid.

When the information collecting unit collects the information the sample number of times, which is a multiple of the predetermined number of times that the information for determining whether a user is valid is collected and is obtained by counting only the cases in which a user is determined to be valid, the security-control unit may update previously set probability information, which includes probabilities of occurrence of each input state and probabilities of transitions between the input states, using probability information that is obtained based on information collected only when the user is determined to be valid, from among pieces of information which are collected until the sample number of times is reached, and calculate the probability of occurrence of a state transition path based on the updated probability information.

According to yet another aspect, there is provided a security-control method comprising sensing a user's input to a user terminal apparatus, collecting pieces of information which indicate input states determined based on the user's input and transition of the determined input state, determining whether the user is valid based on the collected information, and controlling a security function for the user terminal apparatus when it is determined that the user is invalid.

Other features will become apparent to those skilled in the art from the following detailed description, which, taken in conjunction with the attached drawings, discloses exemplary embodiments of the invention.

BRIEF DESCRIPTION OF THE DRAWINGS

Throughout the drawings and the detailed description, the same drawing reference numerals will be understood to refer to the same elements, features, and structures.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions are omitted to increase clarity and conciseness.

Figure 1:
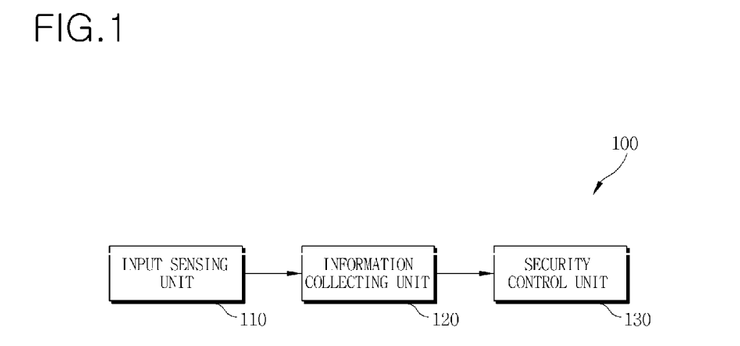
FIG. 1 is a block diagram of a user terminal apparatus having a security function according to an exemplary embodiment.

FIG. 1 is a block diagram of a user terminal apparatus 100 that has a security function according to an exemplary embodiment. Referring to FIG. 1, the user terminal apparatus 100 includes an input-sensing unit 110, an information collecting unit 120, and a security-control unit 130. The user terminal apparatus 100 may be implemented in a variety of forms such as a portable multimedia player (PMP), a personal digital assistant (PDA), and a mobile phone.

The input sensing unit 110 senses an input of a user who has been previously registered in the user terminal apparatus 100. The input of the user to the user terminal apparatus 100 may be a predetermined motion or input of identification information such that the user may be identified, and any form or method of input may be used.

The information collecting unit 120 determines a state of the input by interpreting the user's input each time the user's input is sensed, and then, the information collecting unit 120 collects information regarding the determined state of the input and a transition of the input state.

According to an exemplary embodiment, the user terminal apparatus 100 may classify the state of the user's input according to criteria for indicating the result obtained by evaluating or processing the user's input.

For example, if a user inputs his/her fingerprints, the state of the user's input is determined according to a result of processing the user's input by the user terminal apparatus 100. The input state may be classified into a first state in which fingerprint authentication succeeds, a second state in which fingerprint authentication fails, and a third state in which it is impossible to read the input fingerprint. Alternatively, if buttons are used as a means of user input, the input state is determined according to a result of evaluating the user's input. The input state may be classified into a first state in which a speed of moving between a plurality of buttons mounted on the user terminal apparatus 100 is fast, a second state in which the speed is normal, and a third state in which the speed is slow. However, the 'input state' mentioned above may be defined in different ways depending on a type of user's input, and accordingly, it is not limited to the input states described above.

The security-control unit 130 controls the security function of the user terminal apparatus 100 by determining whether the user is authenticated based on the information indicating the input state and the transition of the input state. For instance, the security-control unit 130 locks the user terminal apparatus 100 when it determines that a user is not valid. Locking the user terminal apparatus 100 is carried out by various methods, including halting the whole system and blocking the information stored in the user terminal apparatus 100 from being provided to a user.

According to an exemplary embodiment, the security-control unit 130 determines whether a user is valid using pieces of information collected by the information collecting unit 120 until the number of times the information is collected reaches a predetermined number of times which is the minimum number of times to collect information for determining whether the user is valid.

The security-control unit 130 may determine whether the user is valid by comparing a number of times in which a specific input state appears while the information collecting unit 120 collects the information the predetermined number of times with a predetermined reference number of times. That is, the pieces of information regarding the input state, which are collected until the predetermined number of times to collect the information for user authentication determination is reached, is used for determining whether the user is authenticated.

The input sensing unit 110 receives information from a user input means (not shown) of the user terminal apparatus 100 and senses an input motion of the user. The input sensing unit 110 may be implemented in various ways depending on a type of sensed user input or a user identifying means.

For example, when the user input is a fingerprint, the input sensing unit 110 may include a fingerprint recognition sensor. The input sensing unit 110 may include a means for recognizing a user's face or iris each time the user presses a predetermined button. In this case, a user needs to register his/her identification information, for example, fingerprint information, with the user terminal apparatus 100 which may identify a user by recognizing the motion of the user.

A manufacturer of the user terminal apparatus 100 may initially set criteria for the information collecting unit 120 to determine which state a user's input belongs to. Furthermore, criteria for the security-control unit 130 to determine whether a user of the user terminal apparatus 100 is valid may be initially set in the user terminal apparatus 100. However, information as the criteria for determining if the user is valid may be changed as described later.

According to an exemplary embodiment, the user terminal apparatus 100 collects pieces of information regarding the user's input a predetermined sample number of times, which is statistically significant, and the collected input information is used to reset the predetermined number of times that information for user authentication determination is collected and the predetermined reference number of times. In this case, the user motions are learnt to obtain a pattern of user motions so that the obtained pattern may be used as data for determining whether the user is valid.

More specifically, the information collecting unit 120 collects pieces of information regarding the determined input state and the transition of the input state until the information collecting unit 120 collects the information the predetermined sample number of times, which is obtained by counting only cases in which the user is determined to be valid. The sample number of times may be a multiple of the number of times that the information for user authentication determination is collected.

Then, the security-control unit 130 obtains probability information that includes probabilities of occurrence of each input state and probabilities of transitions between input states, based on pieces of information, which are collected only when the user is determined to be valid, amongst the information collected until the sample number of times is reached. Here, the probabilities of transitions between input states include the probabilities of reoccurrence of the same input state as well as the probabilities of change from one state to another state.

When the user terminal apparatus 100 has previously set (or initially set) probability information, the previously set probability information is updated based on the obtained probability information. In this case, the probabilities of occurrence of each input state and the probability of transitions between input states may be updated by averaging the initially set probability information, which includes the probabilities of occurrence of each input state and probabilities of transitions between input states, and the obtained probability information.

By using the updated probability information, appropriate criteria for determining a valid user may be established, reflecting the input of a user authenticated to use the user terminal apparatus 100. Thus, it can be prevented that the user terminal apparatus 100 is locked since an input of the authorized user is wrongly recognized as invalid.

According to another embodiment, the security-control unit 130 may determine if a user is valid by comparing the probability of occurrence of an input state transition path with a predetermined reference value. The probability of occurrence of an input state transition path is the probability of occurrence of permutation of transitions between input states, and may be obtained by the use of probability information set in the user terminal apparatus 100. The probability information includes the probabilities of occurrence of each input state and the probabilities of transitions between input states. The probability of occurrence of a state transition path for determining whether a user is valid is calculated by using information regarding the input state transitions collected during the predetermined number of times.

The probability information to be used to calculate the probability of occurrence of an input state transition path may be updated according to a result of learning the user's input. More specifically, the security-control unit 130 obtains the probability information including the probabilities of occurrence of each input state and the probabilities of transitions between input states based on the pieces of information, which are collected when a user is determined to be valid, from among the pieces of information collected until the sample number of times is reached. The probability information stored in the user terminal apparatus 100 may be updated. The security-control unit 130 may calculate a probability of occurrence of an input state transition path using the updated probability information, and determines if a user is valid.

As such, it may be automatically determined whether a user is valid by using information collected from inputs of the user. Thus, the inconvenience of manually setting a lock on the user terminal apparatus may be minimized, and an immediate security response is provided so that an unauthorized use of the user terminal apparatus and stealing of information from the user terminal apparatus may be effectively prevented.

Figure 2:
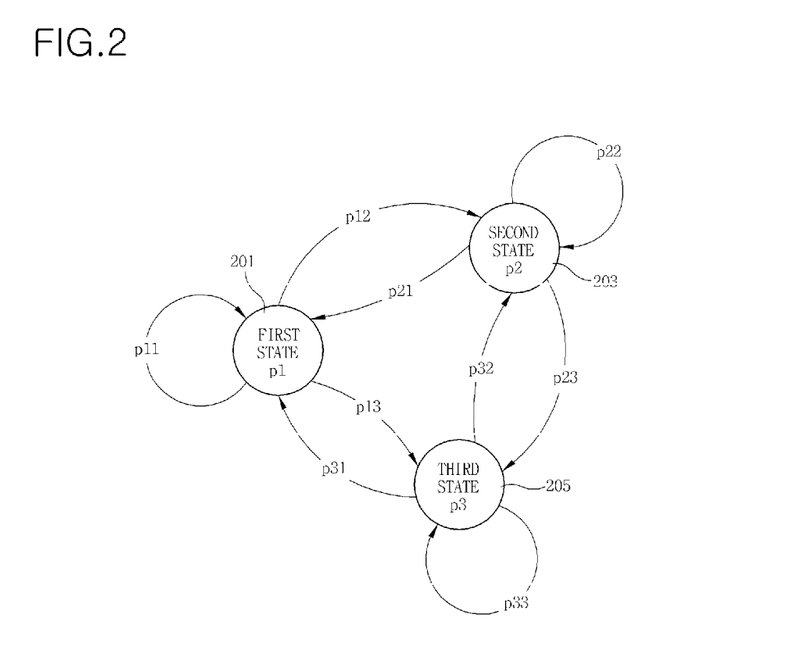
FIG. 2 is a graph showing probability information used for a security-control method of a user terminal apparatus according to an exemplary embodiment.

FIG. 2 is a graph showing probability information used for a security-control method of a user terminal apparatus according to an exemplary embodiment. Referring to FIG. 2, an input state is determined as soon as a user's input is sensed. The input state may be a first state 201, a second state 203, or a third state 205. In FIG. 2, arrows between adjacent input states denote state transitions. For example, the input state may be changed in the order of the first state→the first state→the second state→the third state.

In FIG. 2, probabilities of occurrence of input states are denoted by p1, p2, and p3, respectively, and probabilities of sate transitions are denoted by p11, p12, p13, p21, p22, p23, p31, p32, and p33.

P1 denotes a probability of occurrence of the first state 201, p2 denotes a probability of occurrence of the second state 203, and p3 denotes a probability of occurrence of the third state 205. P11 indicates a probability that the state of the user's input stays in the first state without change, and p12 indicates a probability that the input state is changed from the first state to the second state. That is, a first digit following the reference letter indicates a previous state before state transition, and a second digit indicates a state after the input state transition.

Figure 3A:
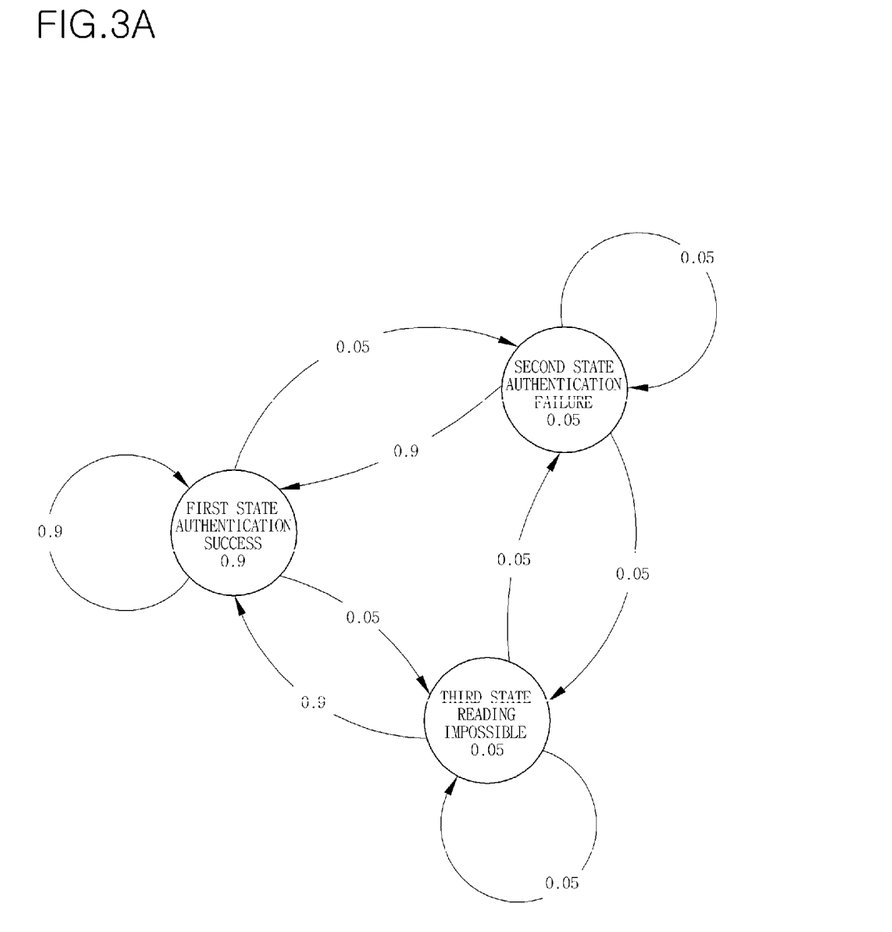
FIGS. 3A to 3C are graphs showing probability information used for the security-control method of a user terminal apparatus according to another exemplary embodiment.
Figure 3B:
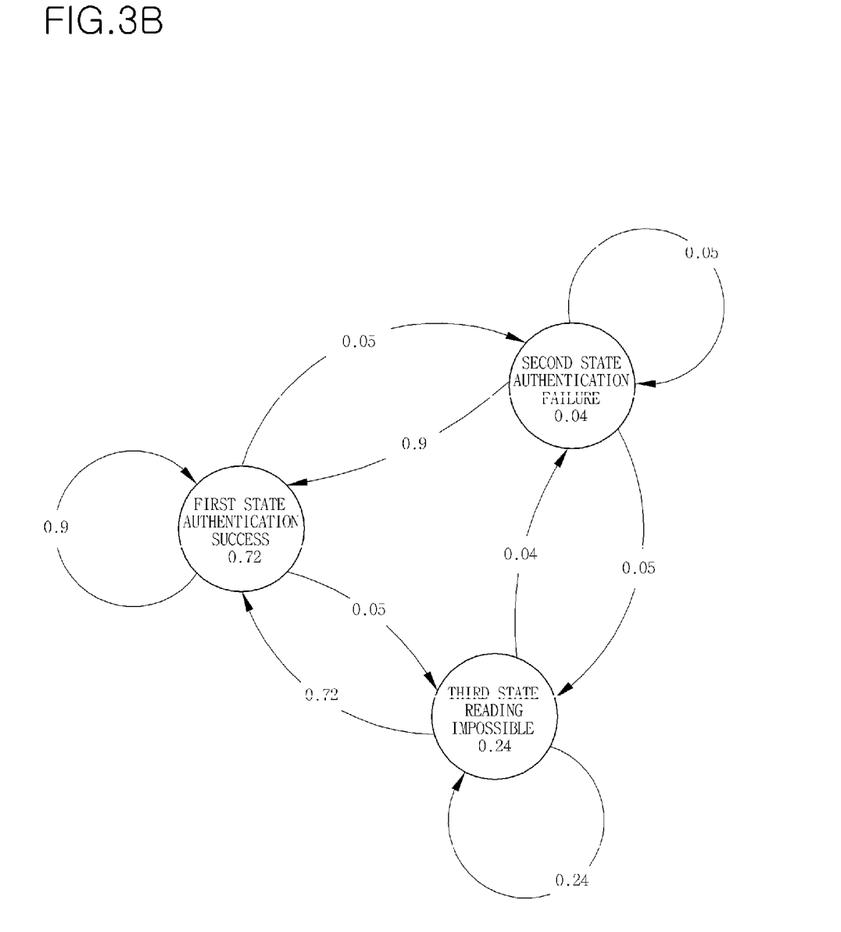
Figure 3C:
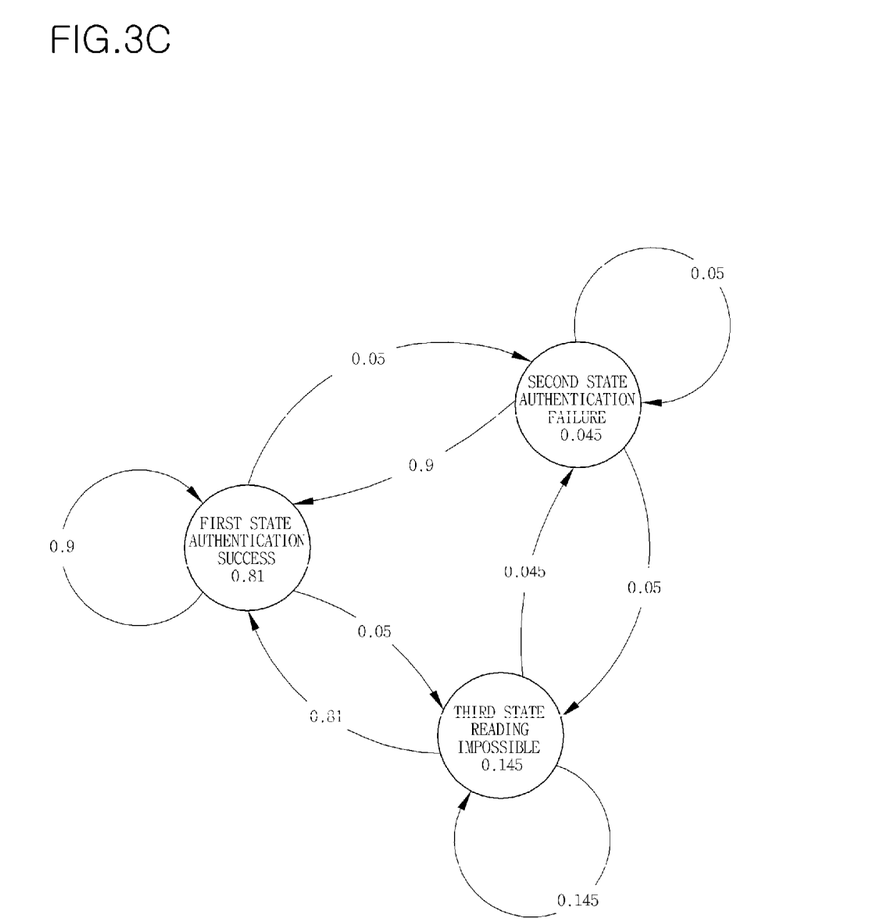

FIGS. 3A to 3C are graphs showing probability information used for the security-control method of a user terminal apparatus according to an exemplary embodiment.

In an exemplary embodiment, it is assumed that the input sensing unit 110 recognizes a fingerprint of a user each time the user presses a button that includes a fingerprint recognition sensor. In FIGS. 3A to 3C, like in FIG. 2, reference numerals denote probabilities of occurrence of each input state and probabilities of transitions between input states. In FIGS. 3A to 3C, a first state is a state in which an input fingerprint is recognized and authenticated, a second state is a state in which the input fingerprint fails to be authenticated, and a third state is a state in which it is not possible to read the input fingerprint.

FIG. 3A is a graph showing the probability information including the probabilities of occurrence of each of three states and the probabilities of transitions between input states initially stored in the user terminal apparatus. The initial probability information may be set and stored in a specific storage space in the user terminal apparatus by a manufacturer. As shown in FIG. 3A, when a success rate of fingerprint recognition authentication is 90 percent, the probability p1 of occurrence of the first state is set as 0.9, and the probability p2 of occurrence of the second state and the probability p3 of occurrence of the third state are respectively set as 0.05. The probabilities of transitions between input states may be set as shown in FIG. 3A.

In an exemplary embodiment, it is assumed that the user terminal apparatus is initially set in a manner that a predetermined number of times that information for user authentication determination is collected is set to be 10 button presses and it is determined that a user is invalid (that is, the result is "False") if the authentication or reading of a fingerprint fails more than 9 times among the 10 button presses. Otherwise it is determined that a user is valid (that is, the result is "True"). In other words, the security-control unit may determine whether a user is valid by comparing a number of times for which a specific state occurs until the predetermined number of times that the information for user authentication determination is collected is reached with a predetermined reference number of times.

The predetermined number of times that the information for user authentication determination is collected and the reference number of times may be set in such as manner that an error probability is low, which is a probability that a valid user is recognized as invalid and a probability that an invalid user is recognized as valid. The error probability is set to be smaller than a reference error probability, which is an allowable error probability. Thus, the reference error probability should be set significantly small.

A first error probability of recognizing a valid user as invalid may be calculated by Equation 1.

$$\text{First error probability} = (p_1 \times S1[n] + p_2 \times S2[n] + p_3 \times S3[n]) + (A2[n] + A3[n]) \quad \text{Equation 1}$$

In Equation 1, an expression in the first parenthesis is for calculating a probability of a state being changed from any state to the first state once during a predetermined number n of times that information for user authentication determination is collected, and an expression in the second parenthesis is for calculating a probability of a state not going into the first state. Here, S1[n] is a probability of a state being changed from the first state to the first state only once during n number of times, S2[n] is a probability of a state being changed from the second state to the first state once during n number of times, and S3[n] is a probability of a state being changed from the third state to the first state once during n number of times. A2[n] is a probability of a state being changed from the second state to any state other than the first state during n number of times, and A3[n] is a probability of a state being changed from the third state to any state other than the first state during n number of times. S1[n], S2[n], S3[n], A2[n], and A3[n] may be obtained by the use of various probability calculation methods.

Meanwhile, a second error probability of recognizing an invalid user as valid may be calculated by Equation 2.

$$\text{Second error probability} = \sum_{i=2}^{n} (1-p_1)^i p_1^{n-1} \qquad \text{Equation 2}$$

However, the above-described methods are only exemplary embodiments, and a variety of methods may be employed to calculate the probabilities and set criteria for determining whether a user is valid.

As described above, the user terminal apparatus may determine whether a user is valid using information regarding the input states determined according to the initial information shown in FIG. 3A while that information for user authentication determination is collected the predetermined number of times.

The information collecting unit 120 collects information regarding determined states and transition of the determined states until the sample number of times is reached. In an exemplary embodiment, the sample number of times is a multiple of the number of times that information for user authentication determination is collected, and is obtained by counting only the cases in which a user is determined to be valid.

Amongst the pieces of information collected until the sample number of times is reached, the pieces of information collected when the user is determined to be valid may be used for the security-control unit 130 to reset the predetermined number of times that information for user authentication determination is collected and the predetermined reference number of times as criteria for determining whether a user is valid. To this end, the security-control unit 130 may reset the criteria for determining whether a user is valid using probabilities of occurrence of each input state and probabilities of transitions between input states.

For example, if a user who has been authorized to use a user terminal apparatus wears gloves while operating buttons on the user terminal apparatus, an error probability may be greater than a reference error probability since it is determined whether a user is valid based on information which was initially collected when the user operated the user terminal apparatus with his/her bear hands. Therefore, information about the user's input is collected and criteria for determining whether a user is valid are reestablished, thereby reducing the possibility of recognizing a valid user as invalid.

FIG. 3B is a diagram showing the probabilities of occurrence of each input state and probabilities of transitions between input states which are calculated by the security-control unit by using the information collected when the user is determined to be valid, from among the pieces of information collected until the sample number of times is reached. This calculation result indicates the result of the user terminal apparatus learning inputs of a user, and the calculated probabilities in FIG. 3B are different from the probabilities in FIG. 3A.

FIG. 3C shows probability information updated based on the initially set probabilities of occurrence of each input state and probabilities of transitions between input states in FIG. 3A and the probabilities of occurrence of each input state and probabilities of transitions between input states generated as a result of learning of the user's inputs. More specifically, the probability information in FIG. 3C is obtained by averaging the probabilities in FIG. 3A and the probabilities in FIG. 3B.

To reduce a possibility of recognizing a valid user as invalid, the predetermined number of times that the information for user authentication determination is collected and the reference number of times may be reestablished. For example, it may be determine that a user is invalid if authentication fails or reading a fingerprint fails seven times among nine times of button press, or otherwise, the user is determined to be valid. Numbers or probability values mentioned above are only for explanation, and it is not limited thereto.

Figure 4A:
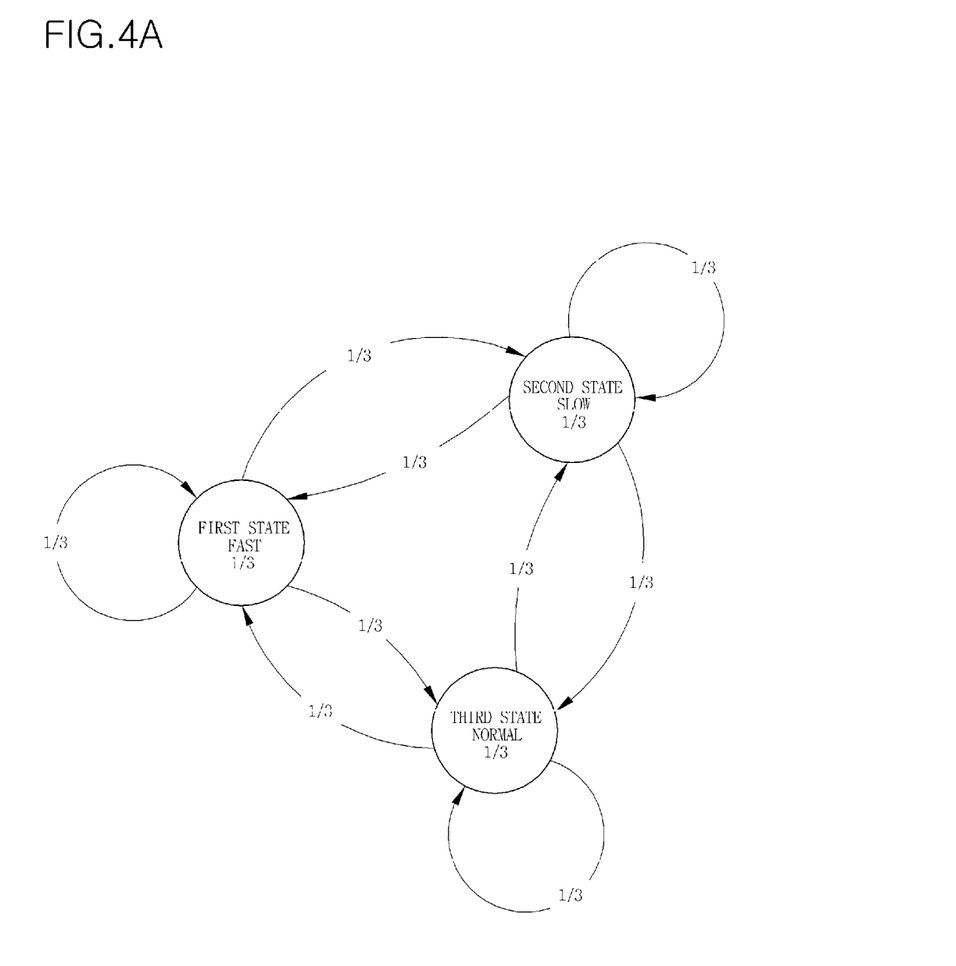
FIGS. 4A and 4B show probability information used for a security-control method of a user terminal apparatus according to another exemplary embodiment.
Figure 4B:
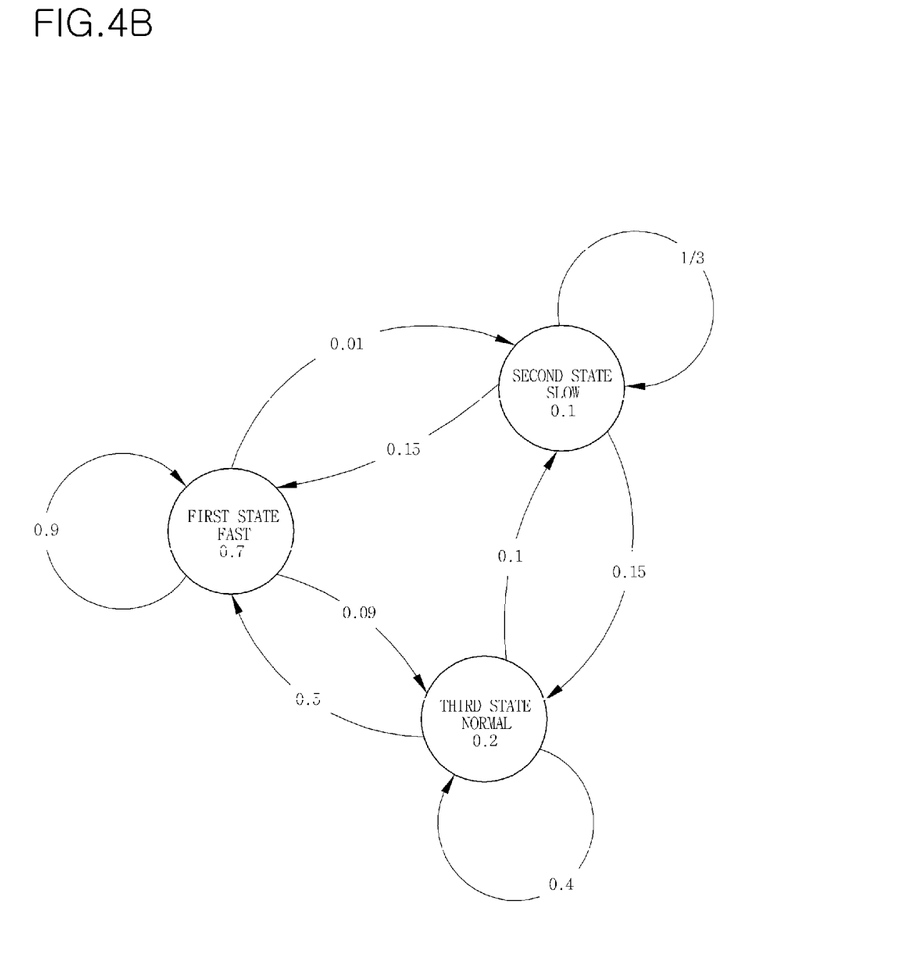

FIGS. 4A and 4B show probability information used for a security-control method of a user terminal apparatus, according to another exemplary embodiment.

In this case, it is assumed that an input sensing unit of the user terminal apparatus has a sensor that measures a speed a of user's input motion by recognizing the user's pressing motion each time the user performs a predetermined motion. The user terminal apparatus has initial probability information including three states of a user's input and probabilities of transitions between input states as shown in FIG. 4A.

Each user input belongs to either of a first state in which a speed of moving between a plurality of buttons is determined to be fast, a second state in which the moving speed is determined to be normal, and a third state in which the moving speed is determined to be slow. An example of a criterion to determine each input state will be described below.

It is assumed that the user terminal apparatus has a key pad including buttons of a 3×4 matrix form. Buttons next to a predetermined button are designated as adjacent buttons and the other buttons that are not adjacent to the predetermined button are designated as remote buttons. The predetermined button is a button that a user has pressed recently, and thus the adjacent buttons and the remote buttons may be changed when the user presses a different button.

Here, it is assumed that the first state is determined when the user presses the adjacent button within 0.1 seconds of the predetermined button being pressed and presses the remote button within 0.3 seconds, the second state is determined when the user presses the adjacent button between 0.1 and 0.3 seconds and presses the remote button within between 0.3 and 0.6 seconds and the third state is determined when the user presses the adjacent button more than 0.3 seconds later and presses the remote button more than 0.6 seconds later.

Also, a predetermined number of times that the information for user authentication determination is collected is assumed in this case as eleven times of button press. In addition, a user may be determined to be invalid if a probability of occurrence of a state transition path during the predetermined number of times that the information for user authentication determination is collected is smaller than a predetermined reference value, for example, $(1/3)^{10}$, or otherwise the user is determined as valid.

For instance, when a state is changed in the order of the first state→the second state→the first state→the third state, the probability of occurrence of a state transition path may be calculated as p1×p12×p21×p13.

Meanwhile, the initial probability information may not be set imperatively in the current embodiment since information for identifying a user is not collected every time when the user's input is sensed, unlike in the previous embodiment described above with reference to FIGS. 3A to 3C.

It is assumed that a user usually presses buttons both quickly and slowly when the user uses a user terminal apparatus while driving. Probability information obtained until the number of times a user presses buttons reaches a sample number of times is used to update the previously set probability information. FIG. 4B shows probability information generated based on the results collected during the sample number of times, that is, the result of learning of user's inputs. The probability information includes probabilities of occurrence of each input state and probabilities of transitions between input states.

A security-control unit 130 may update the probability information, as shown in FIG. 4B, based on the information collected only when the user is determined to be valid, from among the pieces of information which indicate input states and state transitions and are collected until the sample number of times is reached. Unlike in FIG. 3C, the updated probability information in FIG. 4B does not consider the previously set probability information.

Thus, the security-control unit 130 calculates a probability of occurrence of a state transition path during a predetermined number of times that the information for user authentication determination is collected using the updated probability information, and may determine if the user is valid or invalid by comparing the calculated probability value with a reference value.

Figure 5:
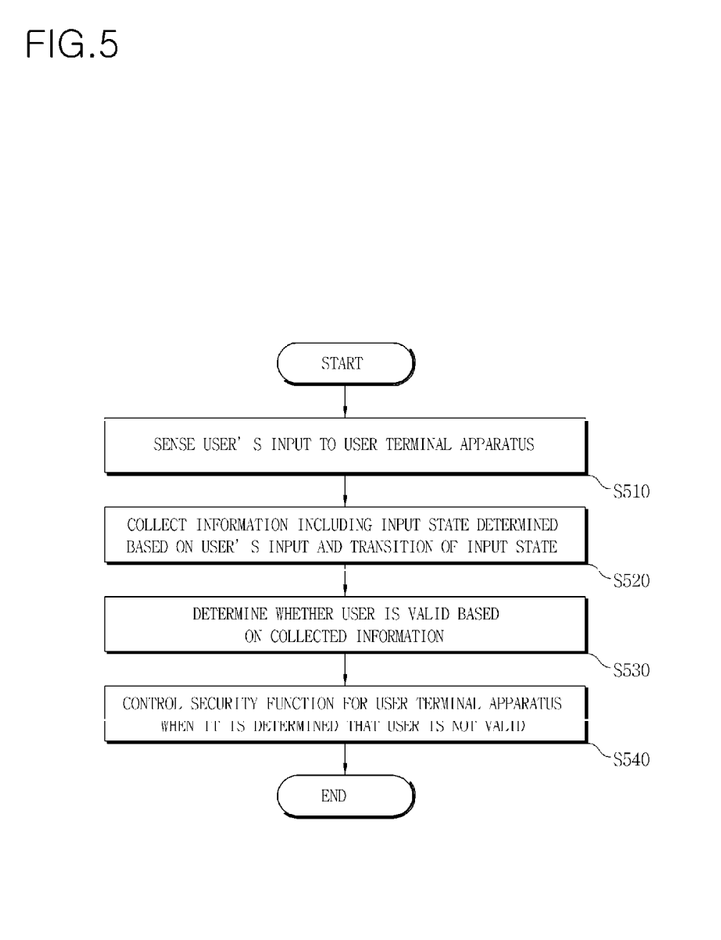
FIG. 5 is a flowchart illustrating a security-control method of a user terminal apparatus according to an exemplary embodiment.

FIG. 5 is a flowchart illustrating a security-control method of a user terminal apparatus according to an exemplary embodiment. Referring to FIG. 5, the input sensing unit senses a user's input to the user terminal apparatus (operation S510).

The information collecting unit collects information indicating states of the user's inputs and state transitions (operation S520). According to an aspect, the input state may be determined by criteria for indicating the results of the evaluation of the user's input or the process of the user's input.

The security-control unit determines whether a user is valid based on the collected information (operation S530). Specifically, the security-control unit determines whether the user is valid based on the information collected until the information collecting unit collects the information a predetermined number of times which is the minimum number of times that information for determining whether the user is valid is collected.

According to another exemplary embodiment, it may be determined whether the user is valid by comparing a number of times of occurrence of a specific state, from among states determined during a predetermined number of times that the information for user authentication determination is collected, with a predetermined reference number of times (operation S530).

According to another exemplary embodiment, it may be determined whether the user is authenticated by comparing a probability of occurrence of a state transition path with a predetermined reference value (operation S530).

The security-control unit controls the user terminal apparatus to perform a security function when it is determined that the user is invalid (operation S540).

According to an aspect, the predetermined number of times that information for user authentication determination is collected and the reference number of times may be updated later by the following procedures.

Specifically, in operation of S520, when a number of times that information is collected reaches the sample number of times, which is obtained by counting the cases in which the user is determined to be valid, the probability information including probabilities of occurrence of each input state and probabilities of transitions between input states is generated based on the information collected only when the user is determined to be valid from among the information collected until the sample number of times is reached. The sample number of times is a multiple of the predetermined number of times that the information for user authentication determination is collected. Previously set probability information is updated using the generated probability information, and a number of times that the information for user authentication determination is collected and a predetermined reference number of times may be reset based on the updated probability information.

According to another exemplary embodiment, it may be determined whether a user is valid by reflecting the result of learning the user's inputs. More specifically, the previously set probability information is updated using the probability information, which includes the probabilities of occurrence of each input state and the probabilities of transitions between input states, and is obtained in operation S520. Therefore, a probability of occurrence of a state transition path may be calculated based on the updated probability information.

According to certain embodiments described above, a user terminal apparatus may automatically determine whether a user is valid based on pieces of information that may be collected from a user's input. Thus, a problem that a user needs to manually set to lock up the user terminal apparatus may be solved, and an immediate security response may be provided if there is fraud of the user terminal apparatus or leakage of the information stored in the user terminal apparatus.

Also, a precision of determination whether a user is valid may be improved by using probability information, which includes probabilities of occurrence of each input state and probabilities of transitions between the input states and is updated reflecting a result of learning user's inputs.

The methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. The media may also be a transmission medium such as optical or metallic lines, wave guides, and the like including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations and methods described above.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A user terminal apparatus comprising:
an input sensing unit configured to sense a user's input to the user terminal apparatus;
an information collecting unit configured to collect information regarding input states, which are determined based on the user's input, and a transition of the determined input states; and
a security-control unit configured to determine whether the user is valid based on at least a comparison of the collected information with contextual information, and controls a security function,
wherein the transition of the determined state includes the staying in the one input state and the changing from one input state to another input state,
wherein the security-control unit compares a number of times that a specific input state occurs among the determined input states with a predetermined reference number of times to determine whether the user is valid, and
wherein when the information is collected a sample number of times, which is a multiple of the predetermined reference number of times that the information to determine whether the user is valid is collected and is obtained by counting only the cases in which the user is determined to be valid, the security-control unit updates previously set probability information, which includes probabilities of occurrence of each of the input states and probabilities of transitions between the input states, using probability information that is obtained based on information collected only when the user is determined to be valid, from among pieces of information which are collected until the sample number of times is reached, and resets the predetermined number of times that the information to determine whether the user is valid is collected and the predetermined reference number of times based on the updated probability information.

2. The user terminal apparatus of claim 1, wherein the security-control unit determines whether the user is valid by using pieces of information which are collected the predetermined reference number of times which is the minimum number of times that information for determining whether the user is valid is collected.

3. The user terminal apparatus of claim 1, wherein the input state is determined based on criteria for indicating a result obtained by evaluating or processing the input of the user.

4. The user terminal apparatus of claim 1, wherein criteria for determining whether the user in the security-control unit is valid are initially set.

5. The user terminal apparatus of claim 1, wherein the contextual information comprises user characteristics relating to a plurality of contexts in which the user inputs the user's input.

6. The user terminal apparatus of claim 1, wherein the contextual information relates to at least one of: user characteristics relating to user input that is input while the user is operating a vehicle; user characteristics relating to user input that is input while the user is wearing hand wear; user characteristics relating to user input that is input while the user is preoccupied; and user characteristics relating to user input that is input under normal conditions.

7. A security-control method comprising:
sensing a user's input to a user terminal apparatus;
collecting pieces of information which indicate input states determined based on the user's input and transition of the determined input states;
determining whether the user is valid based on at least a comparison of the collected information with contextual information;
controlling a security function for the user terminal apparatus when it is determined that the user is invalid,
wherein the transition of the determined state includes the staying in the one input state and the changing from one input state to another input state, and
wherein the determining of whether the user is valid is performed based on a result obtained by comparing a number of times of occurrence of a specific input state among the determined input states with a predetermined reference number of times,
wherein the collecting of the information comprises:
when a sample number of times is reached, which is a multiple of the predetermined reference number of times that the information to determine whether the user is valid is collected and is obtained by counting only the cases in which the user is determined to be valid, updating previously set probability information, which includes probabilities of occurrence of each of the input states and probabilities of transitions between the input states, using probability information that is obtained based on information collected only when the user is determined to be valid, from among pieces of information which are collected until the sample number of times is reached, and
resetting the predetermined number of times that the information to determine whether the user is valid is collected and the predetermined reference number of times based on the updated probability information.

8. The security-control method of claim 7, wherein the determining of whether the user is valid is based on the pieces of information collected the predetermined reference number of times which is the minimum number of times that information for determining whether the user is valid is collected.

9. The security-control method of claim 7, wherein the input state is determined based on criteria for indicating a result obtained by evaluating or processing the input of the user.

10. A user terminal apparatus comprising:
an input sensing unit which senses a user's input to the user terminal apparatus;
an information collecting unit which collects information regarding input states, which are determined based on the user's input, and a transition of the determined input states; and
a security-control unit which determines whether the user is valid based on the collected information and controls a security function,
wherein the transition of the determined state includes the staying in the one input state and the changing from one input state to another input state;
wherein the security-control unit compares a probability of occurrence of a state transition path with a predetermined reference value to determine whether the user is valid;
wherein when the information collecting unit collects the information a sample number of times, which is a multiple of a predetermined number of times that the information for determining whether the user is valid is collected and is obtained by counting only the cases in which the user is determined to be valid, the security-control unit updates previously set probability information, which includes probabilities of occurrence of each input state and probabilities of transitions between the input states, using probability information that is obtained based on information collected only when the user is determined to be valid, from among pieces of information which are collected until the sample number of times is reached, and calculates the probability of occurrence of the state transition path based on the updated probability information.

11. A security-control method comprising:
   sensing a user's input to a user terminal apparatus;
   collecting pieces of information which indicate input states determined based on the user's input and transition of the determined input states;
   determining whether the user is valid based on the collected information; and
   controlling a security function for the user terminal apparatus when it is determined that the user is invalid,
   wherein the transition of the determined state includes the staying in the one input state and the changing from one input state to another input state;
   wherein the determination of whether the user is valid is performed based on a result obtained by comparing a probability of occurrence of a state transition path with a predetermined reference value to determine whether the user is valid; and
   wherein the collecting of the information comprises:
   when a sample number of times is reached, which is a multiple of a predetermined number of times that the information for determining whether the user is valid is collected and is obtained by counting only the cases in which the user is determined to be valid, updating previously set probability information, which includes probabilities of occurrence of each of the input states and probabilities of transitions between the input states, using probability information that is obtained based on pieces of information collected only when the user is determined to be valid, from among pieces of information which are collected until the sample number of times is reached; and
   calculating the probability of occurrence of the state transition path based on the updated probability information.

* * * * *